(12) United States Patent
Lee

(10) Patent No.: US 11,608,121 B2
(45) Date of Patent: Mar. 21, 2023

(54) INDOOR MAINTENANCE COVER OF BUS

(71) Applicants: Hyundai Motor Company, Seoul (KR); Kia Motors Corporation, Seoul (KR)

(72) Inventor: Seung-Ju Lee, Jeollabuk-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 305 days.

(21) Appl. No.: 17/000,526

(22) Filed: Aug. 24, 2020

(65) Prior Publication Data
US 2021/0276628 A1 Sep. 9, 2021

(30) Foreign Application Priority Data
Mar. 6, 2020 (KR) .................. 10-2020-0028476

(51) Int. Cl.
*B62D 25/20* (2006.01)
*B62D 25/10* (2006.01)
*B62D 25/12* (2006.01)
*B62D 31/02* (2006.01)

(52) U.S. Cl.
CPC ....... *B62D 25/2054* (2013.01); *B62D 25/105* (2013.01); *B62D 25/12* (2013.01); *B62D 31/02* (2013.01)

(58) Field of Classification Search
CPC .. B62D 25/105; B62D 25/12; B62D 25/2054; B62D 25/2063; B62D 25/20; B62D 31/02; B60R 2011/0029; B60R 2011/0005; B60R 2011/0007; B60J 5/0497; B60J 5/0491; B60J 5/0477; B60J 5/125
See application file for complete search history.

(56) References Cited

U.S. PATENT DOCUMENTS

| | | | | |
|---|---|---|---|---|
| 1,794,938 | A * | 3/1931 | Wunderlich | B60J 5/125 414/537 |
| 3,022,107 | A * | 2/1962 | Daniels | B62D 25/12 49/260 |
| 9,352,695 | B1 * | 5/2016 | Karosa | B60N 2/309 |
| 10,040,397 | B1 * | 8/2018 | Wuerthele | B60N 2/793 |
| 10,836,322 | B2 * | 11/2020 | Suzuki | B60R 7/04 |
| 11,220,197 | B2 * | 1/2022 | Hodgson | B60N 2/793 |
| 2014/0145470 | A1 * | 5/2014 | Preisler | B62D 29/04 52/309.1 |

(Continued)

FOREIGN PATENT DOCUMENTS

KR 20-0233148 5/2001

*Primary Examiner* — Gregory A Blankenship
(74) *Attorney, Agent, or Firm* — Fox Rothschild LLP

(57) ABSTRACT

An indoor maintenance cover of a bus includes: a frame mounted on a maintenance hole; a first door and a second door in which respective both ends are connected to the frame by a hinge pin to open/close the maintenance hole; an interlocking device configured to join a hinge pin connected to one end of the first door and a hinge pin connected to one end of the second door, the interlocking device facing the hinge pin so that the first door and the second door rotate while interlocking with each other; and a fastener fastening the first door and the second door while the first door and the second door are closed. The maintenance cover can be installed to prevent accidents while increasing operability for easily opening or closing the maintenance hole in the bus.

9 Claims, 7 Drawing Sheets

(56) References Cited

U.S. PATENT DOCUMENTS

2015/0344077 A1* 12/2015 Mauduit ............... B60L 3/0084
                                                    180/65.8
2018/0111499 A1*  4/2018 Wada .................... B60K 11/04
2021/0276628 A1*  9/2021 Lee ...................... B62D 31/02

* cited by examiner

INDOOR MAINTENANCE COVER OF BUS

CROSS-REFERENCE TO RELATED APPLICATION(S)

This application claims under 35 U.S.C.§ 119 the benefit of Korean Patent Application No. 10-2020-0028476, filed on Mar. 6, 2020 in the Korean Intellectual Property Office, the entire contents of which are incorporated by reference herein.

BACKGROUND

1. Technical Field

The present disclosure relates to an indoor maintenance cover of a bus, more particularly, to the indoor maintenance cover used in the bus for improving safety and preventing accidents that may occur through a maintenance hole, while increasing operability of a maintenance cover for opening/closing the maintenance hole.

2. Description of the Related Art

In general, a bus is used for carrying a large number of passengers, and vehicle maintenance is performed for bus operation and passenger safety. In particular, on a floor inside the bus, a maintenance hole typically is provided through which the engine and other components of the bus can be checked or repaired, and a maintenance cover is configured for opening and closing the maintenance hole.

The maintenance cover normally closes the maintenance hole to block noise, dust, fumes and/or heat flowing through the maintenance hole, and at the same time, prevents passengers from moving, and opens the maintenance hole during maintenance to enable maintenance of components in the vehicle at which the maintenance hole is positioned.

In the related art, Korean Registered Utility Model No. 20-0233148 (Engine Inspection Cover Assembly of Bus) discloses a maintenance cover that forms top and bottom rims on a basic frame of a cover frame in a single-stage structure and forms a double sealing structure using a sealing pad and a weather strip and connects the double sealing structure to a vehicle body frame to remove complexity of an engine inspection cover structure and increase a sealing effect.

Meanwhile, the maintenance cover disclosed in this reference is formed parallel to the floor inside the bus and when maintenance cover is removed during vehicle maintenance, maintenance workers or passengers may not be aware of an open state of the maintenance hole. In this case, feet of the maintenance workers or passengers may get stuck in the maintenance hole, or an accident may occur by a person falling through the maintenance hole. Since a plurality of bolts fastened to the vehicle body frame should be released in order to remove the maintenance cover, there is also a problem in that removing and mounting operations of the maintenance cover are troublesome. Therefore, the above-described reference does not solve the important problem of preventing accidents by use of the maintenance cover.

SUMMARY

The present disclosure provides a maintenance cover which enables maintenance workers and passengers to easily recognize a state in which a maintenance hole is opened while facilitating removing and mounting operations of the maintenance cover.

An exemplary embodiment of the present disclosure provides an indoor maintenance cover of a bus, which includes: a frame mounted on a maintenance hole; a first door and a second door in which respective both ends are connected to the frame by a hinge pin to open/close the maintenance hole; an interlocking device configured to join a hinge pin connected to one end of the first door and a hinge pin connected to one end of the second door, which faces the hinge pin so that the first door and the second door rotate while interlocking with each other; and a fastener fastening the first door and the second door while the first door and the second door are closed.

A first end of the hinge pin may be inserted into the insertion hole formed in the frame and a second end may be fixed to the first door, or the second door and an extraction hole may be formed on one side of the insertion hole so that the first end of the hinge pin is extracted from the frame.

The interlocking device may be configured by a wire and a hinge pin connected to one end of the first door and a hinge pin connected to one end of the second door, which faces the hinge pin may be wound in a staggered winding scheme by the wire.

A wire guide may be formed in the wire so as to prevent the wire from being twisted and a spring may be formed in which a first end of the spring is connected to the frame and a second end of the spring is connected to the wire to maintain tension of the wire.

A fixation pin may be formed at a portion where the wire is wound on the hinge pin so as to prevent the wire from being loosen.

The fastener may include a fastening bracket having a fastening hole formed on one side and mounted on the first door or the second door, and a fastening bolt in which a first end of the fastening bolt is inserted into the fastening hole and a washer is mounted on a second end of the fastening bolt.

The frame may include a first locking jaw formed to support the first door or the second door to be closed and a second locking jaw formed to support the first door or the second door to be opened.

According to an exemplary embodiment of the present disclosure, since a first door and a second door are kept open in a double hinge manner during maintenance, a passenger or worker can easily recognize a state in which a maintenance hole is opened.

According to an exemplary embodiment of the present disclosure, since the number of positions for fastening the first door and the second door is small, it is easy to remove or mount a maintenance cover from or on the maintenance hole.

According to an exemplary embodiment of the present disclosure, since the first door and the second door are interlocked with each other by an interlocking device, when any one door is opened, the other door is also opened.

According to an exemplary embodiment of the present disclosure, since the first door or the second door may be removed from a frame by moving a hinge pin to an extraction hole, maintenance work can be easily performed.

DETAILED DESCRIPTION OF THE EMBODIMENTS

Figure 1:
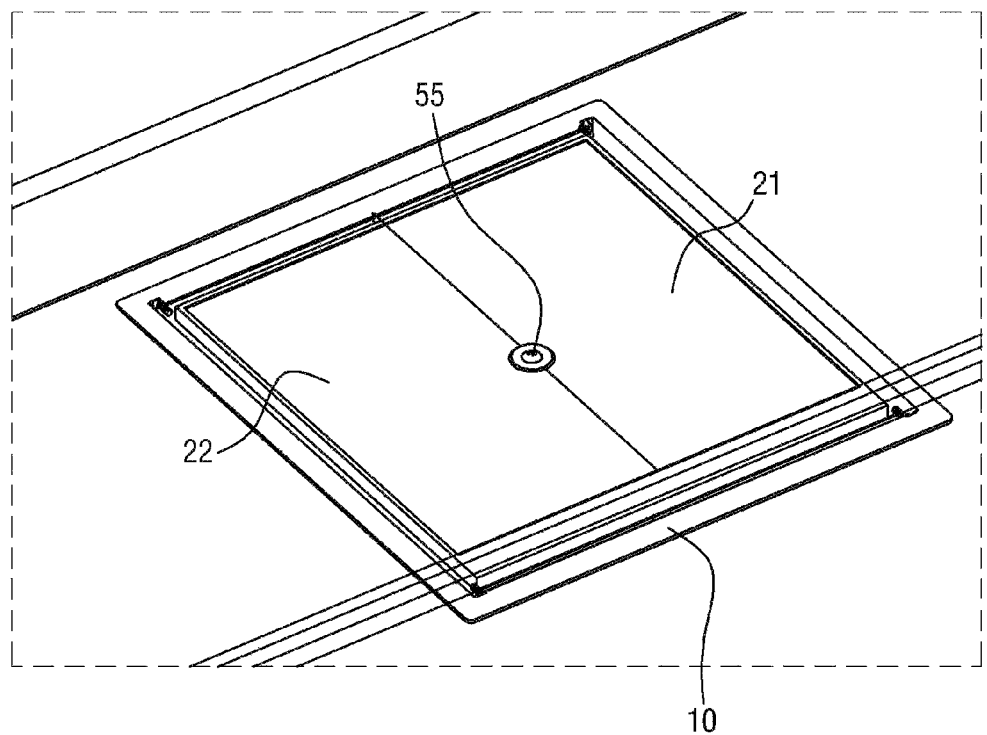
FIG. 1 is a diagram illustrating a state in which a door is closed in an indoor maintenance cover of a bus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of an indoor maintenance cover of a bus according to the present disclosure will be described in detail with reference to drawings. Terms or words used hereinafter should not be interpreted as being limited to ordinary or lexical meanings and should be interpreted as meanings and concepts which match the technical spirit of the present disclosure based on a principle in which the inventor can appropriately define concepts of the terms in order to describe his/her disclosure by the best method.

An indoor maintenance cover of a bus according to an exemplary embodiment of the present disclosure is provided as a maintenance cover for covering a maintenance hole formed on an indoor floor of the bus to prevent a problem in the related art in which the maintenance hole is completely opened during bus maintenance, which presents a safety issue due to the possibility that an accident may occur through the maintenance hole.

Figure 2:
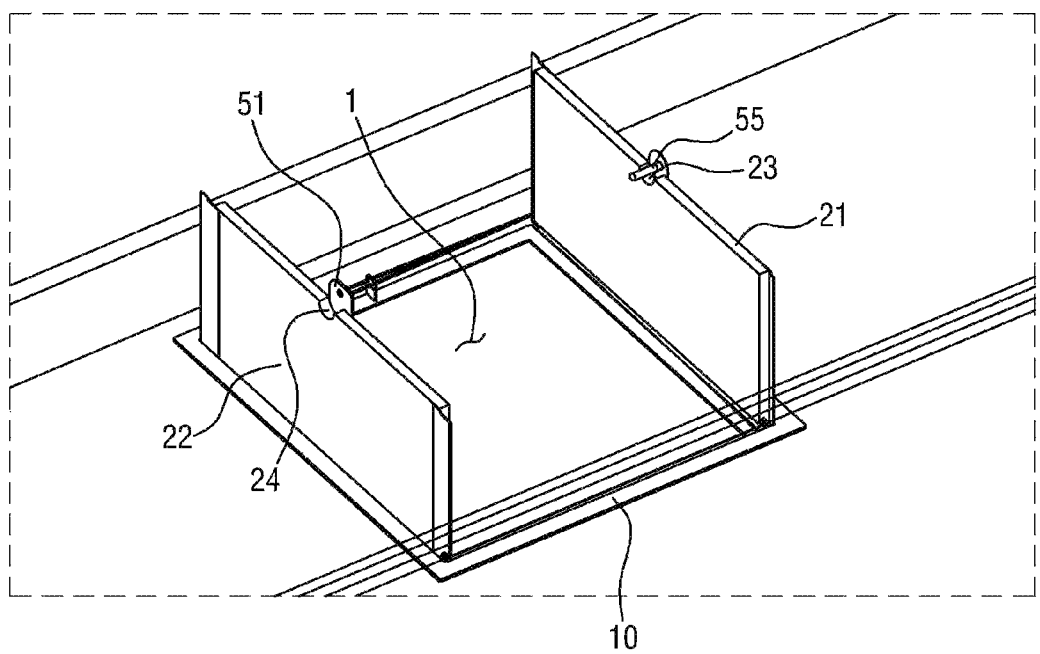
FIG. 2 is a diagram illustrating a state in which the door is opened in the indoor maintenance cover of a bus according to an exemplary embodiment of the present disclosure.

FIG. 1 is a diagram illustrating a state in which a door is closed in an indoor maintenance cover of a bus according to an exemplary embodiment of the present disclosure, and FIG. 2 is a diagram illustrating a state in which the door is opened in the indoor maintenance cover of a bus according to an exemplary embodiment of the present disclosure.

Referring to FIG. 1, normally a maintenance hole 1 is closed by a maintenance cover (a first door 21, and a second door 22), which does not interfere with a passenger or maintenance worker's movement in a bus. Referring to FIG. 2, the maintenance cover (the first door 21, and the second door 22) are opened in a double hinge manner during maintenance, and the maintenance cover is kept forming an angle of approximately 90° with a frame 10, and as a result, the passenger or worker may easily recognize a state in which the maintenance hole 1 is opened. Alternatively, an angle formed between the opened maintenance cover and the frame 10 may be other than 90°. Accordingly, according to the present disclosure, accidents may be prevented during performance of maintenance activities. Hereinafter, a configuration of the indoor maintenance cover of a bus according to an exemplary embodiment of the present disclosure will be described.

Figure 3:
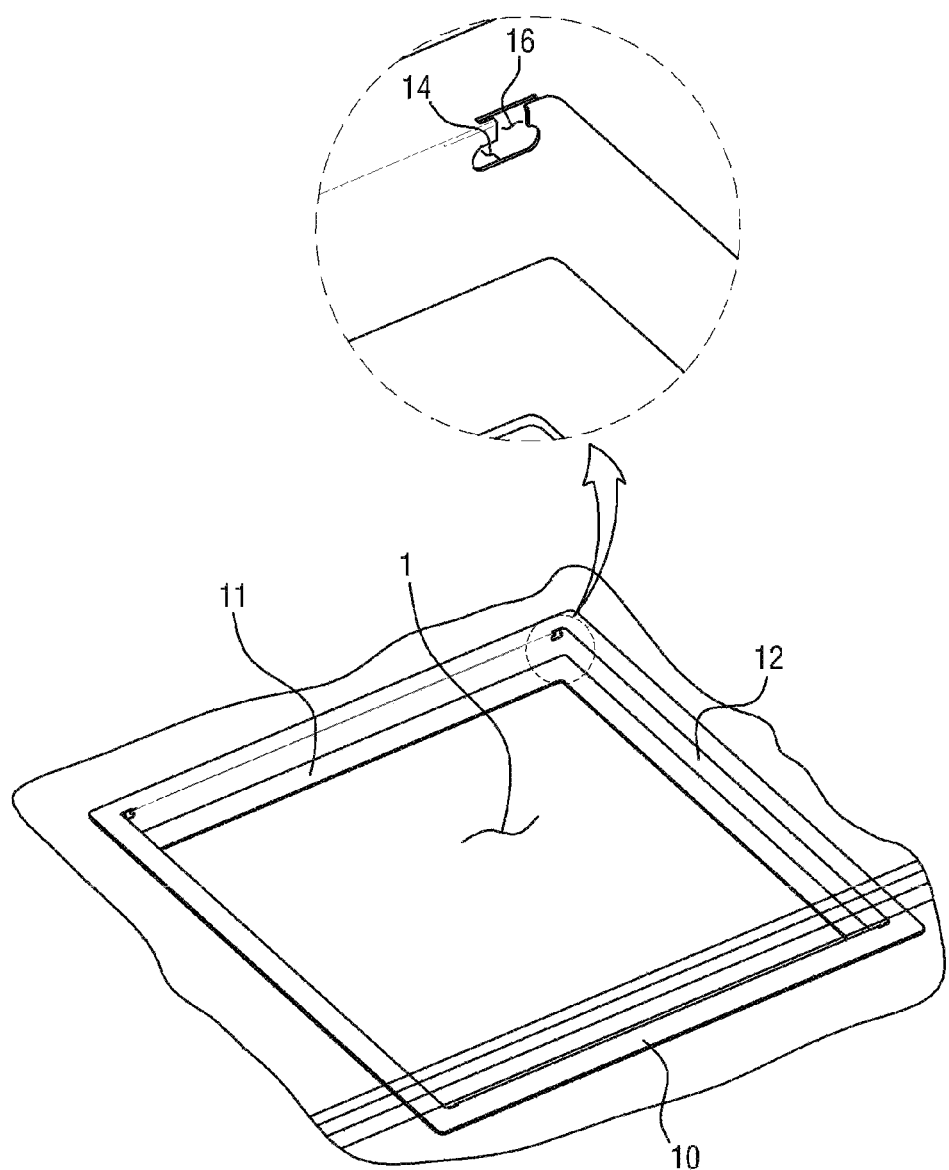
FIG. 3 is a diagram illustrating a frame according to an exemplary embodiment of the present disclosure.
Figure 4:
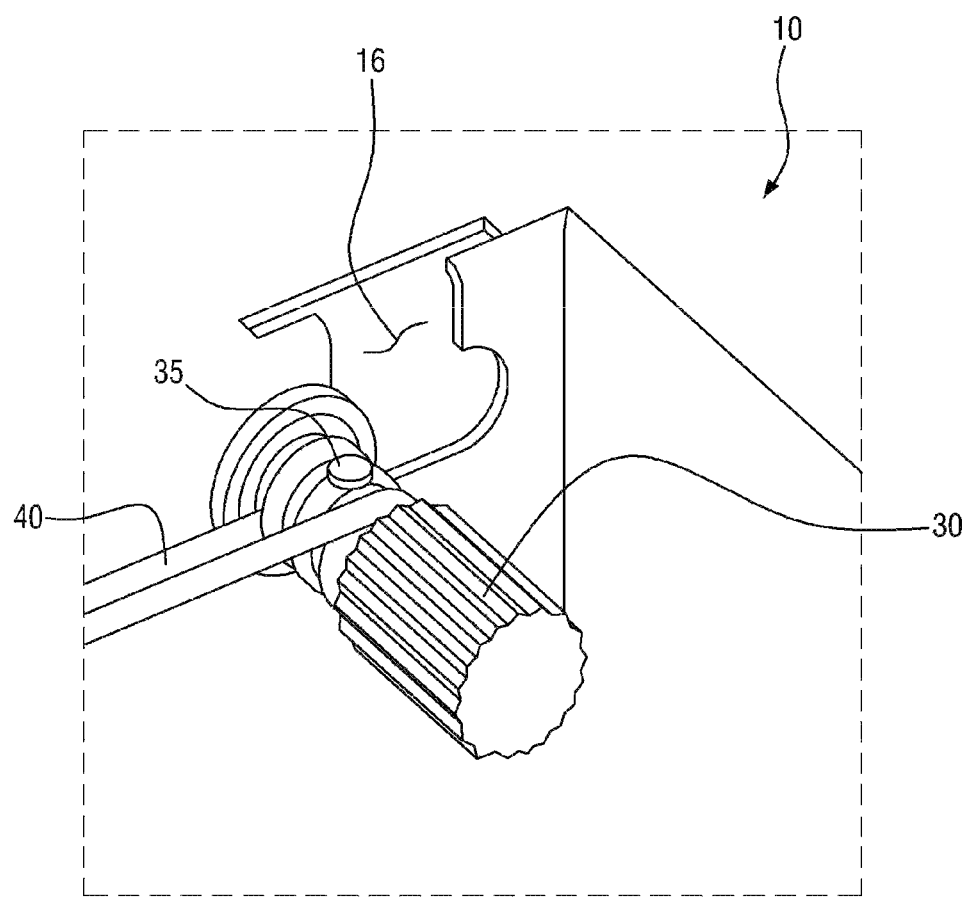
FIG. 4 is a diagram illustrating a state in which a first end of a hinge pin is inserted into a frame according to an exemplary embodiment of the present disclosure.
Figure 5:
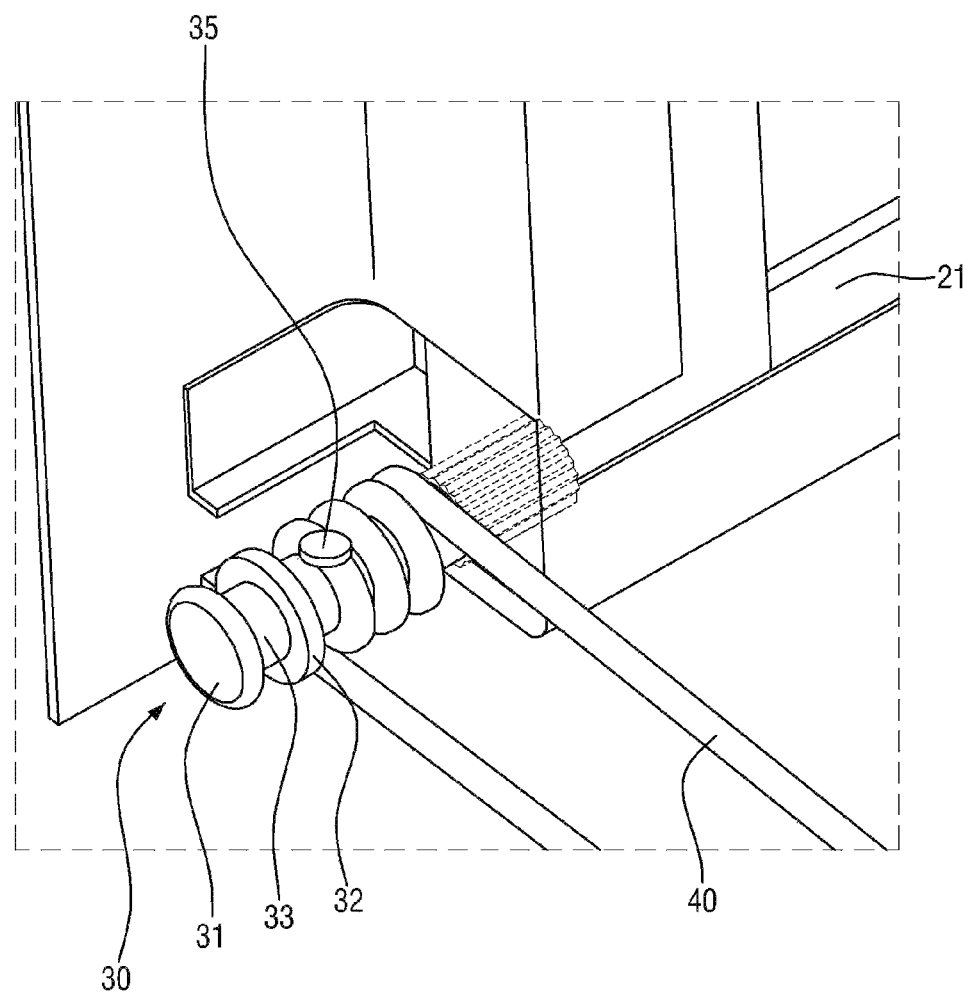
FIG. 5 is a diagram illustrating a state in which a second end of the hinge pin is fixed to a door according to an exemplary embodiment of the present disclosure.

FIG. 3 is a diagram illustrating a frame according to an exemplary embodiment of the present disclosure, FIG. 4 is a diagram illustrating a state in which a first end of a hinge pin is inserted into a frame according to an exemplary embodiment of the present disclosure, and FIG. 5 is a diagram illustrating a state in which a second end of the hinge pin is fixed to a door according to an exemplary embodiment of the present disclosure.

The indoor maintenance cover of a bus according to an exemplary embodiment of the present disclosure includes a frame 10, a first door 21, a second door 22, an interlocking device, and a fastener.

Referring to FIG. 3 the frame 10 which is fixed to an indoor floor of the bus so as to form the maintenance hole 1 has a shape in which the first door 21 and the second door 22 may be connected to and seated on the frame 10. In an exemplary embodiment of the present disclosure, the frame 10 is configured in a substantially rectangular shape, but the shape of the frame 10 is not so limited.

In the frame 10, a first locking jaw 11 which supports the first door 21 or the second door 22 to be kept in a closed state and a second locking jaw 12 which supports the first door or the second door 22 to be kept in an opened state are formed.

The first door 21 is connected to one side of the frame 10, and the second door 22 is connected to the other side of the frame 10. At a portion where the first door 21 or the second door 22 is connected to the frame 10, an insertion hole 14 into which a first end of the hinge pin 30 is inserted and an extraction hole 16 from which the first end of the hinge pin 30 is extracted are formed. In an exemplary embodiment of the present disclosure, the insertion hole 14 and the extraction hole 16 are formed in an inclined direction while being connected to each other.

Referring to FIG. 5, the first end of the hinge pin 30 includes a first head 31 and a second head 32 and an insertion portion 33 is formed therebetween. Meanwhile, the insertion hole 14 has a smaller size than the first head 31 and the second head 32, and the extraction hole 16 has a larger size than the first head 31 and the second head 32. Referring to FIG. 4, when the first end of the hinge pin 30 is inserted through the extraction hole 16 and then moves to the insertion hole 14, the insertion portion 33 is seated onto the insertion hole 14 to be connected to the frame 10. A process of extracting the first end of the hinge pin 30 from the frame 10 can be performed in a reverse manner to the aforementioned process.

The first door 21 and the second door 22 which open/close the maintenance hole 1 in the double hinge manner while facing each other are rotatably connected to the frame 10. A second end of the hinge pin 30 is inserted into ends of both sides (both sides where the doors are connected to the frame) of the first door 21 and the second door 22. Referring to FIG. 5, the second end of the hinge pin 30 are inserted and fixed into the doors 21 and 22. In an exemplary embodiment of the present disclosure, the second end of the hinge pin 30 is subjected to serration processing. However, there is no limit in a scheme in which the second end of the hinge pin 30 is fixed to the doors 21 and 22.

A first bolt insertion groove 23 and a second bolt insertion groove 24 are formed near centers of sides (i.e., the sides where the doors face each other) of the first door 21 and the second door 22. When the first bolt insertion groove 23 and the second bolt insertion groove 24 are connected to face each other, a hole is formed. Functions of the first bolt insertion groove 23 and the second bolt insertion groove 24 will be described in a fastener to be described below.

Figure 6:
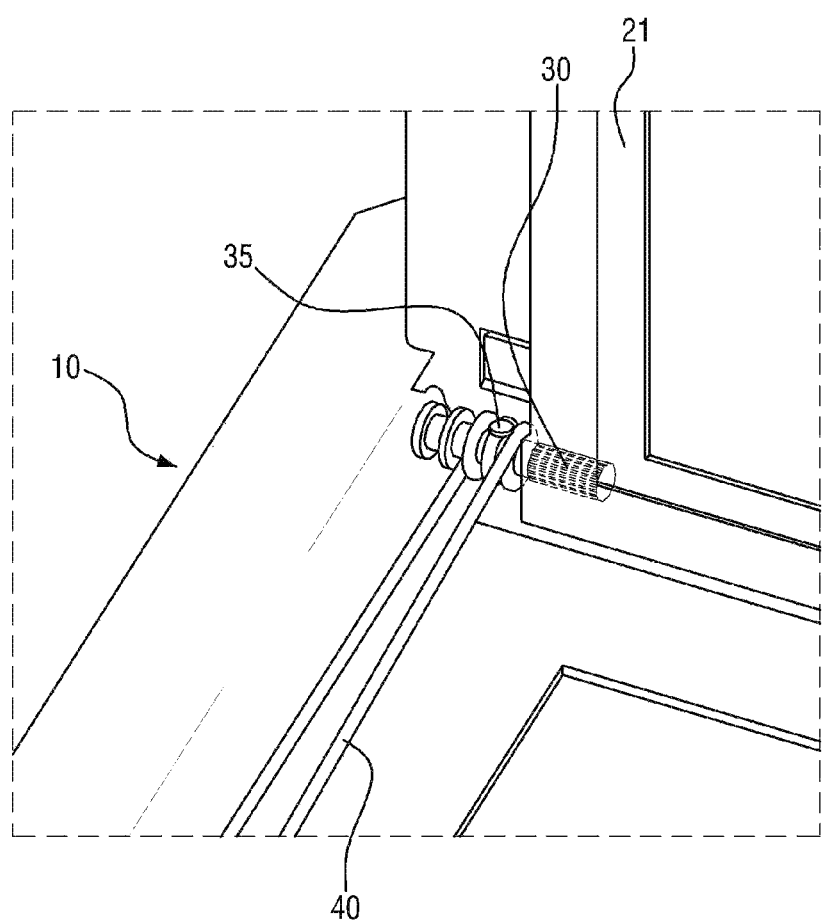
FIG. 6 is a diagram illustrating a state in which a wire is connected to a hinge pin according to an exemplary embodiment of the present disclosure.
Figure 7:
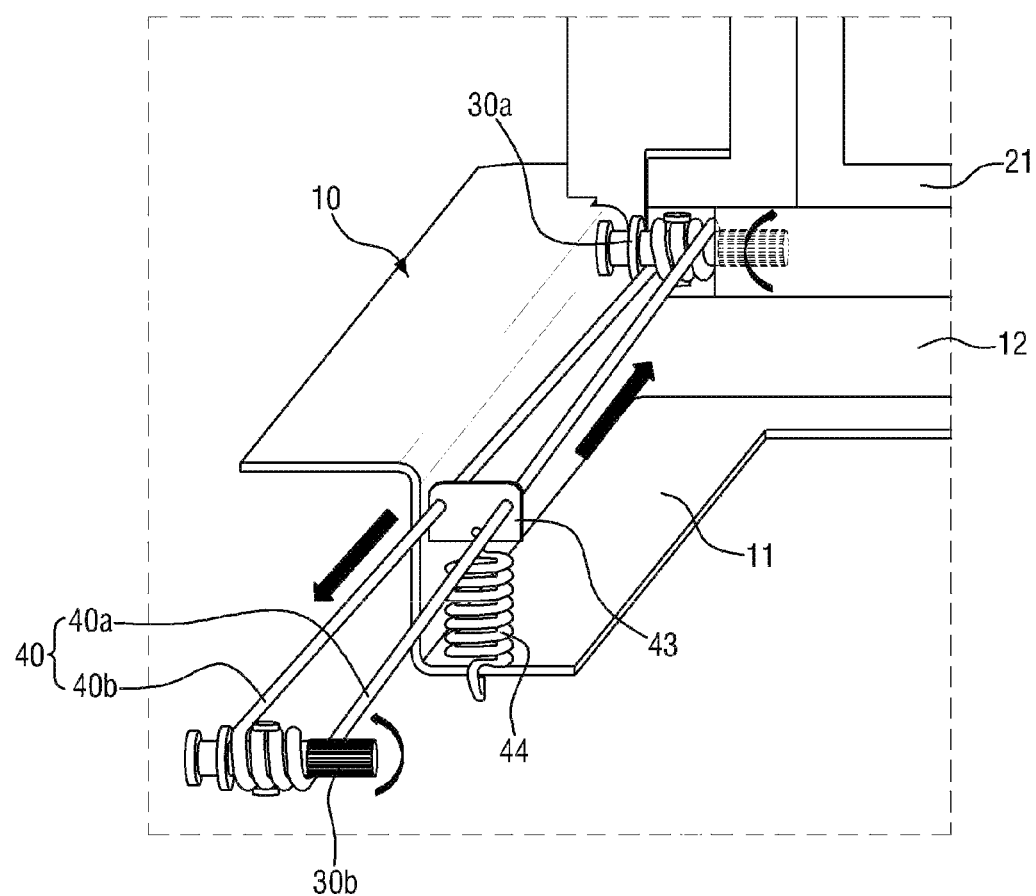
FIG. 7 is a diagram illustrating a state in which the wire is wound on the hinge pin and operated according to an exemplary embodiment of the present disclosure.

FIG. 6 is a diagram illustrating a state in which a wire is connected to a hinge pin according to an exemplary embodiment of the present disclosure, and FIG. 7 is a diagram illustrating a state in which the wire is wound on the hinge pin and operated according to an exemplary embodiment of the present disclosure. Meanwhile, for convenience of description, in FIG. 7, a part of each of the second door 22 and the frame 10 is omitted.

Referring to FIGS. 6 and 7, the interlocking device is arranged such that when any one door 21 or 22 is opened by interlocking the first door 21 and the second door 22 with each other, the other door 21 or 22 is similarly opened. The interlocking device according to an exemplary embodiment of the present disclosure preferably is a wire 40.

The wires 40 are connected to each other while being wound around the hinge pin 30 connected to one end of the first door 21 and the hinge pin 30 connected to one end of the second door 22. Here, for convenience of description, the hinge pin 30 connected to the first door 21 is referred to as a first hinge pin 30a and the hinge pin 30 connected to the second door 22 is referred to as a second hinge pin 30b. A scheme in which the wire 40 connects the hinge pins 30a and 30b can be a staggered winding scheme. For example, the staggered winding scheme is arranged such that a first line 40a of the wire 40 extracted from the top of the first hinge pin 30a is connected to the bottom of the second hinge pin 30b and a second line 40b of the wire 40 extracted from the top of the second hinge pin 30b is connected to the top of the first hinge pin 30a. As a variation from the example, the wire 40 may be wound on the hinge pin 30 in the staggered winding scheme.

A fixation pin 35 is formed at a portion of the hinge pin 30 on which the wire 40 is wound. Accordingly, even if there is an excessive opening/closing operation of the doors 21 and 22, a winding portion of the wire 40 on the hinge pin 30 is fixed by the fixation pin 35, and as a result, winding of the wire 40 is not released.

A wire guide 43 is formed at an approximately middle portion of the wire 40 so as to prevent twist. A plurality of holes having a predetermined interval is formed in the wire guide 43 so as to insert the wire 40. In an exemplary embodiment of the present disclosure, since the first line 40a and the second line 40b are inserted into holes formed in the wire guide 43, respectively to maintain a predetermined interval from each other, the wire 40 is prevented from being twisted.

Meanwhile, a spring 44 is formed so that tension of the wire 40 is maintained while the wire 40 is connected to the hinge pin 30. A first end of the spring 44 is connected to the wire guide 43 and a second end of the spring 44 is connected to the frame 10.

Meanwhile, in another exemplary embodiment of the present disclosure, if the first door 21 and the second door 22 may move while interlocking with each other, the interlocking device may be configured as a saw scheme.

Hereinafter, a process in which the first door 21 and the second door 22 interlock with each other and operate through the wire 40 will be described.

Referring to FIG. 7, when the first door 21 moves in an opening direction while the first door 21 and the second door 22 are closed, the first hinge pin 30a moves in one direction (clockwise in FIG. 7) and the tension is applied to the first line 40a in a direction toward the first door 21. Then, the second hinge pin 30b moves in the other direction (counterclockwise in FIG. 7) and the second door 22 also moves in the opening direction. In this case, it is natural that the first door 21 and the second door 22 move in the opening direction while the tension is applied to the second line 40b in a direction toward the second door 22.

Meanwhile, even when the second door 22 moves in the opening direction while the first door 21 and the second door 22 are closed, the first door 21 moves in the opening direction by the tension applied to the wire 40.

Figure 8:
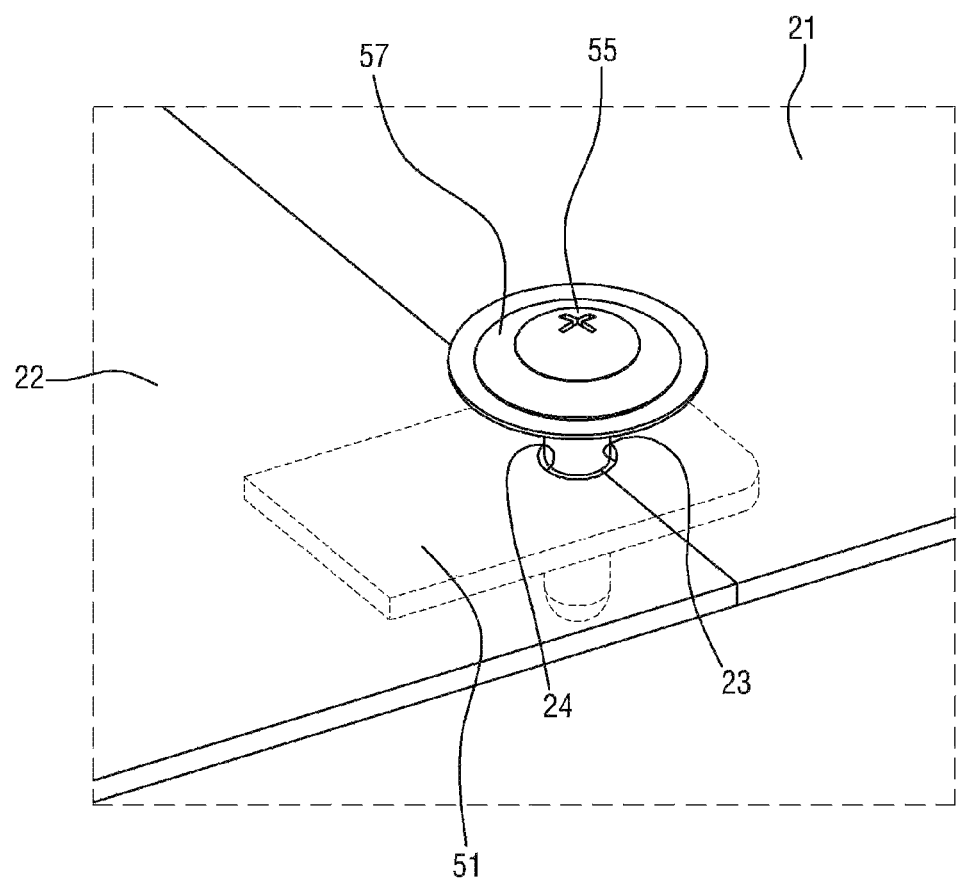
FIG. 8 is a diagram illustrating a fastener according to an exemplary embodiment of the present disclosure.

FIG. 8 is a diagram illustrating a fastener according to an exemplary embodiment of the present disclosure.

The fastener fastens the first door 21 and the second door 22 so that the first door 21 and the second door 22 are kept in the closed state, and the fastener according to an exemplary embodiment of the present disclosure includes a fastening bracket 51 and a fastening bolt 55.

The fastening bracket 51 may be formed in any one of the first door 21 or the second door 22, but for convenience of description, it is assumed that the fastening bracket 51 is formed in the second door 22. In an exemplary embodiment of the present disclosure, the fastening bracket 51 is mounted on a position on the bottom of the second door 22 where the second bolt insertion groove 24 is formed. A fastening hole 53 is formed on one side of the fastening bracket 51.

The fastening bolt 55 fastens the first door 21 and the second door 22 in connection with the fastening bracket 51, and a first end of the fastening bolt 55 is screw-coupled to the fastening hole 53 and a washer 57 is formed on a second end of the fastening bolt 55. The washer 57 may have a size so as not to easily open the first door 21 and the second door 22 at a portion where the first door 21 and the second door 22 contact each other.

When the fastening bolt 55 is inserted into holes formed by the first bolt insertion groove 23 and the second bolt insertion groove 24 while the first door 21 and the second door 22 are in the closed state, the second end of the fastening bolt 55 is screw-coupled to the fastening hole 53 formed in the fastening bracket 51 and the washer 57 formed on the first end of the fastening bolt 55 fastens the first door 21 and the second door 22 to each other.

In the related art, inconvenience that a plurality of bolts should be fastened or released in order to open/close the maintenance hole 1 is caused. However, according to an exemplary embodiment of the present disclosure, since only one fastener is formed at the portion where the first door 21 and the second door 22 contact each other, there is an effect in that ease of assembly of the maintenance cover is enhanced.

Meanwhile, in another exemplary embodiment of the present disclosure, if the fastener could fasten the first door 21 and the second door, the fastener may be configured by another known means such as a rotation latch scheme, a one-touch scheme, etc.

Meanwhile, according to the present disclosure, when the maintenance cover interferes with a maintenance process, the worker may remove the first door 21 or the second door 22 from the frame 10. Specifically, the worker removes the tension applied to the wire 49 by releasing the spring 44 connected to the wire 40 from the frame 10 and then moves the first end of the hinge pin 30 inserted into the insertion hole 14 to the extraction hole 16 to remove the first door 21 or the second door 22 from the frame 10. Then, in this state, the maintenance work may be performed more easily than in the state in which the first door 21 or the second door 22 are mounted on the frame 10.

Although the present disclosure has been described in detail through the representative exemplary embodiment hereinabove, it will be appreciated by those skilled in the art that various modifications of the exemplary embodiment of the present disclosure can be made without departing from the scope of the present disclosure. Therefore, the scope of the present disclosure should not be determined to be limited to the exemplary embodiment and should be defined by appended claims to be described below and all changed or modified forms derived from equivalent concepts to the appended claims.

What is claimed is:

1. An indoor maintenance cover of a bus, comprising:
a frame mounted on a maintenance hole;
a first door having one end connected to one side of the frame by a first hinge pin and a second door having one end connected to an opposite side of the frame by a second hinge pin to open/close the maintenance hole;
an interlocking device configured to join the first hinge pin and the second hinge pin, the interlocking device facing the hinge pin so that the first door and the second door rotate while interlocking with each other; and
a fastener fastening the first door and the second door while the first door and the second door are closed.

2. The indoor maintenance cover of claim 1, wherein
a first end of the first hinge pin is inserted into a first insertion hole formed in the frame and a second end of the first hinge pin is fixed to the first door; and
a first end of the second hinge pin is inserted into a second insertion hole formed in the frame and a second end of the second hinge pin is fixed to the second door.

3. The indoor maintenance cover of claim 2, wherein:
a first extraction hole is formed on one side of the first insertion hole so that the first end of the first hinge pin is extracted from the frame; and
a second extraction hole is formed on one side of the second insertion hole so that the first end of the second hinge pin is extracted from the frame.

4. The indoor maintenance cover of claim 1, wherein the interlocking device is a wire, and
the first hinge pin connected to one end of the first door and the second hinge pin connected to one end of the second door are wound in a staggered winding scheme by the wire.

5. The indoor maintenance cover of claim 4, wherein a wire guide is formed in the wire so as to prevent the wire from being twisted.

6. The indoor maintenance cover of claim 4, wherein a spring is formed so that a first end of the spring is connected to the frame and a second end of the spring is connected to the wire to maintain tension of the wire.

7. The indoor maintenance cover of claim 4, wherein a fixation pin is formed at a portion where the wire is wound on each of the first and second hinge pins so as to prevent the wire from being loosen.

8. The indoor maintenance cover of claim 1, wherein the fastener includes:
a fastening bracket having a fastening hole formed on one side and mounted on the first door or the second door, and
a fastening bolt in which a first end of the fastening bolt is inserted into the fastening hole and a washer is mounted on a second end of the fastening bolt.

9. The indoor maintenance cover of claim 1, wherein the frame includes a first locking jaw formed to support the first door or the second door to be closed and a second locking jaw formed to support the first door or the second door to be opened.

* * * * *